United States Patent [19]

Monleone

[11] 3,796,836

[45] Mar. 12, 1974

[54] DEVICE FOR AUTOMATICALLY SIGNALLING INCOMING CALLS ON NORMAL ALREADY ENGAGED TELEPHONES

[76] Inventor: Irene Monleone, via Guglielmo Silva 29, Milan, Italy 20149

[22] Filed: July 24, 1972

[21] Appl. No.: 274,336

[30] Foreign Application Priority Data

Aug. 12, 1971 Italy .................................. 27466/71

[52] U.S. Cl. ........................... 179/18 BG, 179/84 B

[51] Int. Cl. ............................................. H04m 3/42

[58] Field of Search ........................ 179/18 BG, 84 B

[56] References Cited

UNITED STATES PATENTS

| | | | |
|---|---|---|---|
| 3,626,107 | 12/1971 | Armstrong et al. | 179/18 BC |
| 2,911,478 | 11/1959 | Lomax | 179/84 B X |
| 1,556,751 | 10/1925 | Benson | 179/18 HB |
| 3,472,968 | 10/1969 | Jacobaeus et al. | 179/18 BG |

*Primary Examiner*—Thomas W. Brown

[57] ABSTRACT

A device for automatically signalling incoming calls on normal telephones already engaged, the device comprising, for every telephone in network, an electric circuit located in the telephone exchange and having a resistor in series with the coil of a line selector relay and a switch shunting the resistor and actuated by the coil, the coil of the said relay being connected to the movable arm of the line selector board of the telephone. The circuit also comprises a series of preselectors. In one of the power supply wires of each telephone there is a supplementary resistor with at least one shunt switch. In the auxiliary circuit there is the coil of a very low voltage auxiliary relay controlling the opening of the switch located in the shunt across the supplementary resistor. In series with the coil of each line selector relay there is a thermal switch which is heated when electric current passes and thus opens in the exchange the respective switch located in the auxiliary circuit of each telephone of the network. The opening of the switch located in the shunt across the supplementary resistor determines a drop in the electric voltage supplied to the telephone and hence the signalling of an incoming call.

5 Claims, 6 Drawing Figures

Figure 1:
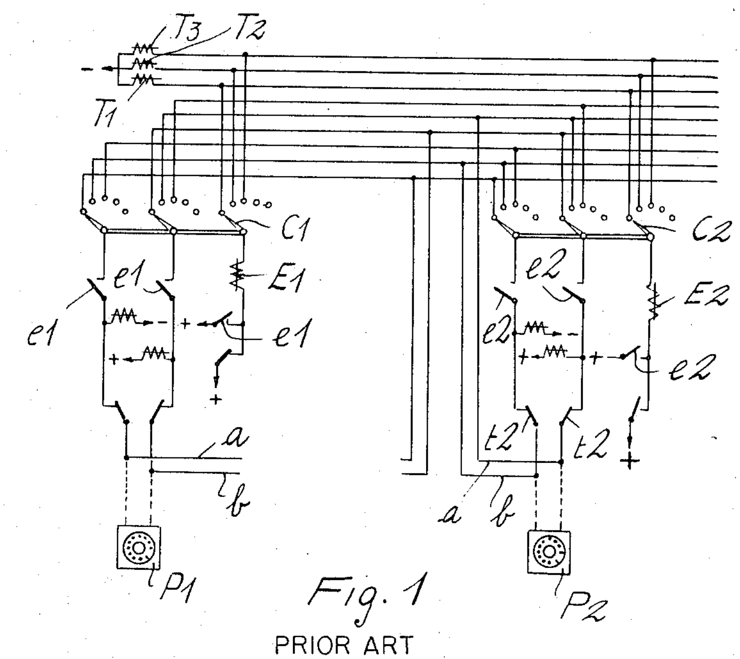
Fig. 1 PRIOR ART

DEVICE FOR AUTOMATICALLY SIGNALLING INCOMING CALLS ON NORMAL ALREADY ENGAGED TELEPHONES

The present invention concerns a device to signal incoming calls on telephones already engaged, and more particularly to a device coming into operation automatically whenever the called user's receiver is lifted, i.e., when the user in question is already engaged in telephone conversation.

It is well known that with present normal telephones users engaged in telephone conversation are unable to be advised of any call coming from outside.

At present the only way of advising a user already engaged in telephone conversation that another user wishes to speak to him is to request the telephone exchange to ask the user in question to break off the communication in order to receive another call.

One purpose of the present invention is therefore to construct a low-cost device of simple structure, such that it will allow a user already engaged in telephone conversation to break it off in order to receive another, perhaps awaited, call announced by means of an easily recognizable signal or to carry it calmly to its conclusion in the certainty that nobody is trying to communicate with him.

Another purpose is to construct a device which will eliminate the serious drawback of numbers difficult to reach because of their being kept engaged for lengthy periods of time, to relieve telephone exchange offices from the burdensome task of clearing engaged lines at the request of users and to speed up the rate of telephone communications and hence increase the efficiency of the telephone network, with consequent economic advantages.

These and yet other purposes are achieved by means of a device for automatically signalling incoming calls on normal telephones already engaged, the device comprising, for every telephone in the network, an electric circuit located in the telephone exchange and having a rated electric resistance in series with the coil of a line selector relay and controlling closure of a switch located in a bridge crossing the said rated resistance, the coil of the said relay being connected to the movable arm of the line selector board of the telephone, the circuit also comprising a series of preselectors, the device being thus characterised that in one of the power supply wires of each telephone there is a supplementary resistance crossed by a bridge with at least one switch, that the line selector relay also controls the closure of switches located in auxiliary circuits connecting the telephone in question with the movable arm of the telephone exchange line selectors board of the other telephones, that in the auxiliary circuit there is the coil of a very low voltage auxiliary relay controlling the opening of the switch located in the bridge crossing the said supplementary resistance, that in series with the coil of each line selector relay there is a thermal switch which is heated when electric current passes and thus opens in the exchange the respective switch located in the auxiliary circuit of each telephone of the network, that the opening of the switch located in the bridge which crosses the said supplementary resistance determines a drop in the electric voltage supplied to the telephone and hence the signalling of an incoming call.

Figure 2:
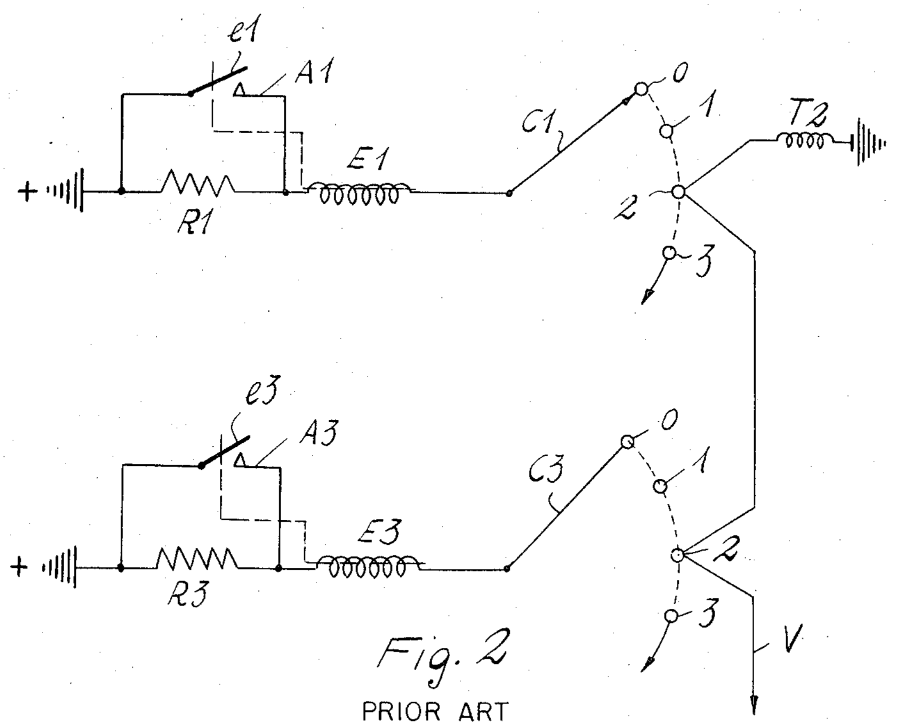
Fig. 2 PRIOR ART
Figure 3:
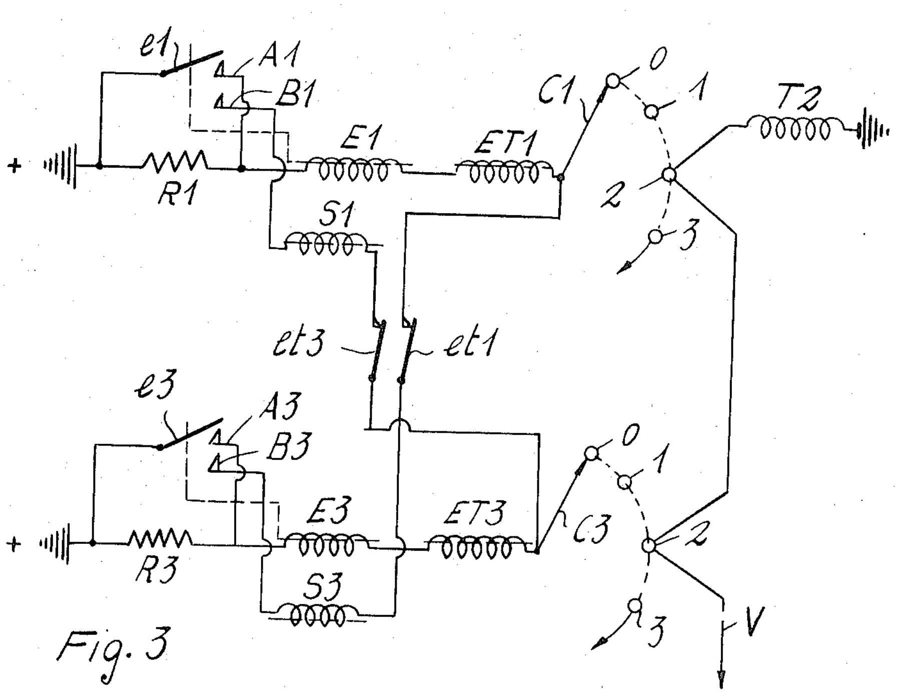
Figure 4:
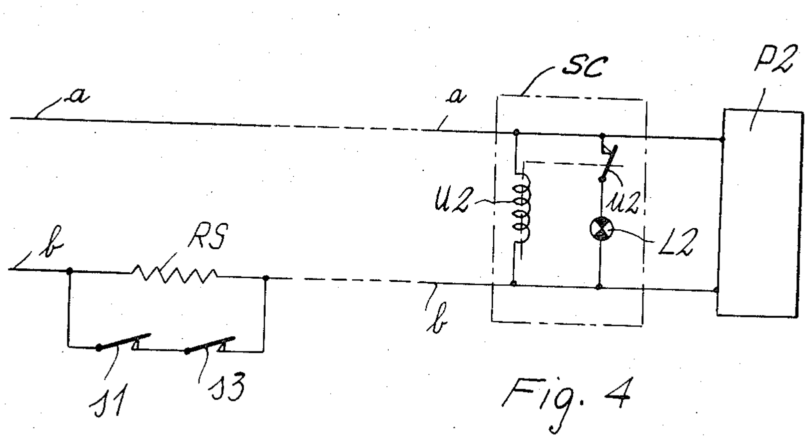

In order to facilitate the understanding of the features and structure of the device, a description will now be given of two preferential but non-limiting embodiments, reference being made to the accompanying drawings in which:

FIG. 1 represents a partial diagram of the connecting circuit between two distinct normal telephones, FIG. 2 is the partial and simplified diagram of the circuit of three normal telephones of known type, FIGS. 3 and 4 are a partial and simplified diagram of the connecting circuit of three normal telephones, the circuit being modified in order to allow signalling of an incoming call on an already engaged telephone, and 26

Figure 5:
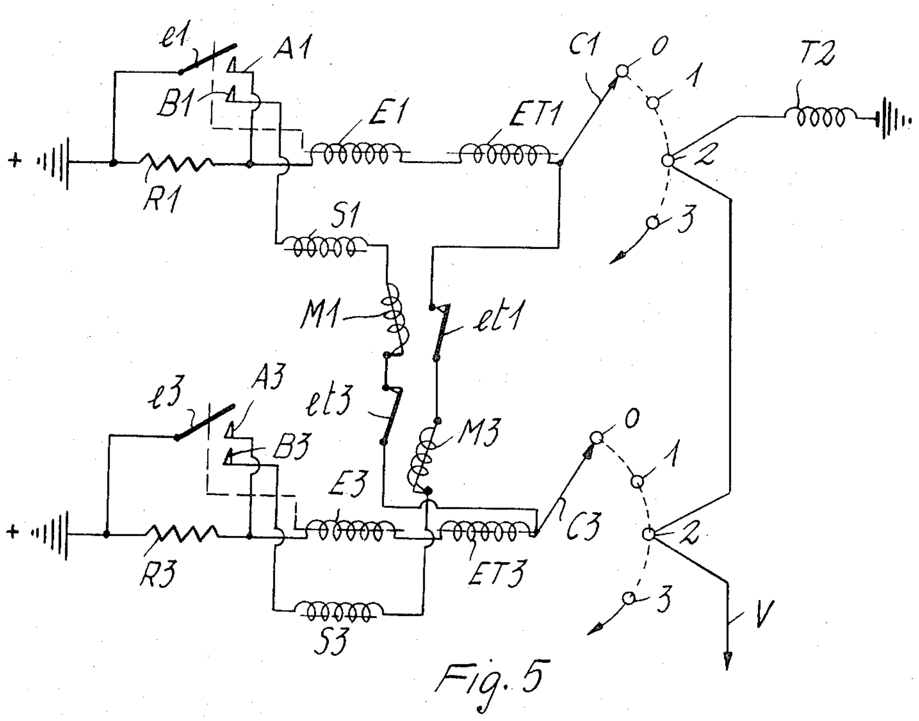
Figure 6:
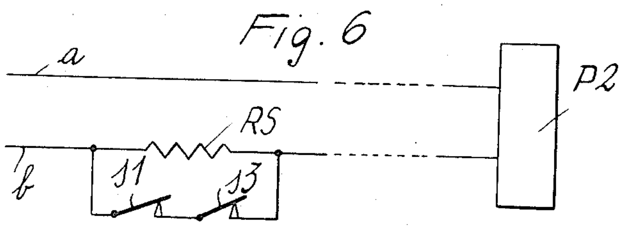

FIGS. 5 and 6 also represent a partial diagram of a variant embodiment of the circuit designed to allow signalling of an incoming call to an already engaged telephone.

In the accompanying drawings the various parts constituting the circuits of three telephones have been indicated always with the same reference letters followed by the number 1, the number 2 or the number 3 according to whether reference is made to a first, second or third normal telephone.

More particularly the letter E indicates the coil of a line selector relay of a normal telephone, such relay comprising a switch which can close the contacts A and B, the letter C indicates the movable arm of the line selector board of the telephone in question, while R is a rated electric resistance, S is a very low voltage relay controlling the opening of a switch *s*, ET is a thermal switch controlling the opening of a contact et. M is also a thermal switch, T is a preselector, V indicates a multipling conductor connecting all the pitches 2 of the boards represented in the drawings and all the other pitches 2 of the successive line selector board; a and b are the power supply wires of each telephone, P is the normal telephone of known type, RS is a supplementary resistance, SC is signalling circuitry at or near each telephone, U is the coil of a signalling relay operating the contact u of a switch, L is a signalling device, while numbers 1, 2 and 3 represent successive pitches of the line selector boards.

Reference is made first of all to FIGS. 1 and 2 which represent parts of a telephone circuit of known type, constructed in accordance with the Siemens system. When the user of telephone P1 wishes to call the user of telephone P2, dialling the number of the second telephone, which is assumed to be free, he causes the arm C1 of the corresponding line selector board to advance until the said arm C1 stops on pitch 2 of the board in question (FIG. 2). In these conditions the current flowing through the coil E1 (which in the Siemens system in question has a resistance of 40 ohms) is of some tens of mA ( in the case under examination, since the resistance R1 is 1000 ohms and the resistance of the first preselector relay T2 of telephone P2 is also 1,000 ohms, the current is 29 mA); hence the relay is excited, causing closure of the switch el on the contact A1, thus cutting out the resistance R1. Since the voltage drop caused by R1 is cut out in this way, the current circulating in coil E1 of the line selector relay of telephone P1 increases and reaches the value of about 57 mA, in accordance with the numerical values of the mentioned resistances.

The foregoing causes the relay T2 of the first preselector of telephone P2 to operate and hence, as a consequence, that of the second preselector, the third, etc., of the various group selectors and of the line selector, still relative to telephone P2. The arrangement of these circuits has, as is well known, the purpose of extending the power supply line (consisting of the wires *a* and *b*) from telephone P1 to telephone P2, allowing conversation between the two users of the mentioned telephones.

Under these conditions it is supposed that the number corresponding to telephone P2 is dialled from a third telephone. In this way the shift of the movable arm C3 of the line selector of the third telephone onto pitch 2 is caused (FIG. 2). The current circulating through arm C3, coil E3 and resistance R3 (having resistances of values equal to those already mentioned) would be of too small intensity (about 2.2 mA) to energize the relay of which coil E3 forms part. In this case a third user would be unable to get through to the user of telephone P2 already engaged in conversation.

When this third user tries to obtain the connection with the second, already engaged in conversation, a certain voltage, albeit of limited value, is established at the terminals of coil E3. With the present invention this voltage is used to automatically send to telephone P2 a signal advising the call by a third subscriber.

Reference is now made to FIGS. 3 and 4 representing an embodiment of the device according to the present invention, which allows a visual signal of the incoming call to be sent to telephone P2.

As can be seen from FIG. 3, the means envisaged for the embodiment of the invention and to be introduced into the already known circuit (FIG. 2) of the line selectors located in the telephone exchange, are fairly simple. Still in the telephone exchange, in each wire b connected to the various telephones a supplementary resistance RS has been inserted and is crossed by a bridge in which are located also in series a number of switches s1, s3 . . . , normally closed, which are opened when the coils S1, S3 . . . of a very low voltage relay (2–3 V) are energized by an electric current. An optical call signal is then provided, consisting of a signal relay with a coil U and a contact u, and an optical device L, which optical call signal can be directly incorporated in each normal telephone or can be outside it.

In conditions of rest the signal relay is not excited and hence the contact u is closed; the optical device, for example an electric bulb, does not transmit any visual signal because between wires *a*, *b* the adequate voltage has not been established. When telephone P1 is put in connection whith telephone P2, the movable arm C1 of the line selector board of telephone P1 moves to pitch 2, thus causing current to pass into the coil E1 which operates the switch el, which successively closes the contacts A1 and B1 thus causing an increase in the intensity of the current passing through the coil E1 relative to the line selector in question. The passing of this current also causes the heating of the thermal switch ET1, the bimetallic leaf of which is deformed and opens the switch et1, although not breaking the circuit to arm C1. Through extension of the power supply line *a*, *b*, current is brought to telephone P2, with the consequence that the relay of which the coil U2 forms part is excited and opens the switch u2, so that the bulb L2 remains unlighted, while the resistance RS remains short-circuited, as shown in FIG. 4. In these conditions the telephones P1 and P2 are in connection with each other and conversation is possible. It is supposed that a third subscribed now dials the number of telephone P2. The movable arm C3 moves to pitch 2 of the line selector board of this third telephone the user of which would receive the engaged signal from the exchange. The current circulating in coil E3 would be insufficient to excite it. In the circuit to which the switch e1, the contact B1, the coil S1, the closed switch et3 and arm C3 belong, a very low voltage would be established at the terminals of coil S1, but with sufficient current passing to cause its excitation. The excitation of the relay to which coil S1 belongs causes the opening of the switch s1 and hence insertion into the circuit of telephone P2 of the supplementary resistance RS of which the ohmic value is calculated so that, when telephone P2 is in connection with telephone P1 but there is no conversation in being, the voltage drop caused by it is the minimum necessary for the coil U2 to be deenergized closing the switch u2 and lighting the signal lamp L2 or operating the optical device provided. It follows that subscriber 3 automatically signals his call to subscriber 2.

As can be noted by examining FIG. 3, the same operation as described occurs when the call positions are reversed.

In the event that both telephone P1 and telephone P2 are connected with two different subscribers, the thermal switches ET1 and ET3 would intervene and cut out the coils S1 and S3, thus avoiding any interference.

It may be remarked that the weakening of reception caused by the reduction in power supply voltage (because of insertion of the supplementary resistance RS during signalling), both when no conversation is occurring in the telephone that is called and when there is circulation of a higher current because of such conversation, would be contained within limits that are certainly acceptable and that such phenomenon is in any case transient and of fairly short duration.

Reference is now made to FIGS. 5 and 6 wherein a variant embodiment of the device is represented, such that it automatically transmits an acoustic signal of an incoming call to the user of a telephone already engaged. In this case all the changes in the usual circuits would be made in the telephone exchange. The known circuit of each normal telephone is modified as shown in FIG. 5, while in addition, still in the exchange, the modification represented in FIG. 6 entirely analogous to that already applied and described with reference to FIG. 4, is made on one of the power supply wires of each telephone.

When telephone P1 (FIG. 1) is placed in connection with telephone P2 (FIG. 1), the movable arm C1 (FIG. 5) moves to pitch 2, the coil E1 is excited and closes the switch e1 on the contacts A1, B1, the thermal switch ET1 is heated, its bimetal bends and opens the contact of the switch et1, although not breaking the circuit to arm C1, while the supplementary resistance RS is still shortcircuited. Through the extensions of the power supply line *a*, *b*, current is brought to telephone P2, and the two telephones P1 and P2 are in connection with each other and the conversation can take place. Let us now suppose that a third user dials the number of telephone P2. In this case the movable arm C3 moves to pitch 2 of the relative line selector board of this third telephone, finds the line blocked and receives the engaged signal from the telephone exchange.

The current passing through the coil E3 is not sufficient to excite it. At the terminals of coil S1 there is however a certain voltage which will cause to circulate therein, and through the thermal switch M1, an electric current capable of exciting such coil S1 and, after a very short time, of causing the thermal switch M1 to open and hence de-energize the coil S1 again. The subsequent cooling of the thermal switch M1 will, after a very short time, restore the power supply circuit of coil S1 and will therefore cause its excitation again. This operating cycle is repeated for the whole period of time during which the movable arm C3 remains on pitch 2.

Excitation of coil S1 causes the switch s1 to open and therefore causes insertion of the supplementary resistance RS into the circuit, with the consequent generation of a current (opening) pulse which will be superimposed on that circulating in telephone P2. Such current pulse will be rendered perceptible in the receiver of telephone P2 in the form of an acoustic signal. The same thing will occur when, on cooling of the bimetal leaf of the thermal switch M1, the coil S1 will again be excited, closing the switch s1 and again shortcircuiting the resistance RS.

Such closure will cause generation of a new current (closing) pulse and the generation of a new acoustic signal likewise perceptible in the receiver of telephone P2.

The above-described operation will therefore cause the dispatch of a series of current pulses, of desired frequency, to telephone P2; advising the user of such telephone that a third user wishes to speak to him.

It may be remarked that the connection and disconnection of the supplementary resistance RS will cause only a slight oscillation of the power supply voltage to telephone P2, which, while it is sufficient to create perceptible current pulses in the receiver of telephone P2 would only produce practically negligible effects on the sound intensity of the conversation being carried on.

The same mode of operation described also occurs when, for example, the calling positions are reversed, i.e., when the third telephone mentioned is in connection with telephone P2 and through telephone P1 a call wants to be signalled to telephone P2.

As in the case previously described, if both telephone P1 and the third telephone mentioned are in connection with two distinct telephones, the thermal switches ET1 and ET3 come into action and cut out coils S1 and S3, thus avoiding any interference, while the thermal switches M1 and M3 will remain closed and the supplementary resistance RS is still shortcircuited.

In keeping with the purposes of the invention, it is clear that, while remaining within the scope of the said invention, such modifications or variants as may be considered opportune by an expert in the field can be made in the device described: in particular, the device can be modified or varied according to the telephone system in which the device is to be inserted, in the event that such system is not the Siemens system to which reference is made in the examples given above.

What I claim is:

1. Apparatus for automatically signalling incoming calls to a telephone already connected to another telephone through the normal communication network of a telephone exchange, the normal communication network at the exchange including: a line selector switch having a movable arm and a plurality of switch positions; and a series circuit connected across a power source and comprising a resistance element with a shunt relay contact thereacross, a selector relay coil operable to open and close said shunt relay contact, and one of a plurality of preselector coils selectable by said line selector switch; said apparatus comprising, for each telephone, auxiliary circuitry located at the exchange, said auxiliary circuitry comprising: a supplemental resistance element series connected in one lead of the power supply lines extending to each telephone; at least one supplementary relay contact shunting said supplemental resistance element; a thermal switch coil placed in said series circuit; a low voltage relay coil series connected with a thermal switch contact actuated by said thermal switch coil, the low voltage relay coil and thermal switch contact being connected between the arm of said line selector switch and one of the power lines of said power source; whereby the opening of said supplemental relay contact in response to actuation of said low voltage relay, which in turn is actuated by a third telephone being connected to the connection already made between said telephone and said other telephone, alters the current in said power supply lines and thus effects signalling of an incoming call.

2. The apparatus according to claim 1, including an optical incoming call signalling device coupled to each telephone, comprising a coil of a signalling relay connected between said two power supply wires, a signalling indicator device also connected between said two power supply wires and a relay switch in series with said indicator device and operated by the signalling relay which closes said switch when, at the terminals of the signalling relay coil, the voltage is too low as a result of the opening of said supplementary relay contact shunting said supplemental resistance element.

3. The apparatus according to claim 2, wherein said supplemental resistance element has a value such that the voltage drop it causes is the minimum necessary to cause de-energizing of the signalling relay in the absence of conversation but with telephones connected to each other.

4. The apparatus according to claim 1, wherein said auxiliary circuitry includes a second thermal switch which, being heated when electric current passes through it, breaks said auxiliary circuitry, restoring its continuity as soon as said second thermal switch has cooled, thereby establishing acoustic signals in the receiver of the telephone called.

5. The apparatus according to claim 1, wherein said auxiliary circuitry comes into operation through the effect of the power source voltage present between system ground and the arm of the line selector switch of a third telephone, when such arm moves onto the switch position corresponding to the connection to another telephone already engaged.

* * * * *